(12) United States Patent
Hayashi (10) Patent No.: US 10,029,583 B2
(45) Date of Patent: Jul. 24, 2018

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP); SHIROKI CORPORATION, Kanagawa (JP)

(72) Inventor: Hiroaki Hayashi, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 28 days.

(21) Appl. No.: 15/442,187

(22) Filed: Feb. 24, 2017

(65) Prior Publication Data

US 2017/0246966 A1   Aug. 31, 2017

(30) Foreign Application Priority Data

Feb. 29, 2016   (JP) ................................ 2016-037388

(51) Int. Cl.
| | |
|---|---|
| *B60N 2/06* | (2006.01) |
| *B60N 2/08* | (2006.01) |
| *B60N 2/12* | (2006.01) |
| *B60N 2/00* | (2006.01) |
| *B60N 2/22* | (2006.01) |
| *B60N 2/68* | (2006.01) |

(52) U.S. Cl.
CPC ............... *B60N 2/002* (2013.01); *B60N 2/06* (2013.01); *B60N 2/22* (2013.01); *B60N 2/682* (2013.01)

(58) Field of Classification Search
CPC . B60N 2/06; B60N 2/002; B60N 2/12; B60N 2/07; B60N 2/0715; B60N 2/0732; B60N 2/682
See application file for complete search history.

(56) References Cited

U.S. PATENT DOCUMENTS

| | | | |
|---|---|---|---|
| 7,427,720 B2 * | 9/2008 | Furukawa .............. | B60N 2/002 177/211 |
| 7,770,863 B2 | 8/2010 | Yamada et al. | |
| (Continued) | | | |

FOREIGN PATENT DOCUMENTS

| | | |
|---|---|---|
| DE | 102010042285 | 4/2012 |
| JP | 1-145535 | 10/1989 |
| (Continued) | | |

OTHER PUBLICATIONS

Japanese Office Action for JP App. No. 2016-037388 dated Dec. 5, 2017, along with English-language translation thereof.

*Primary Examiner* — Shin H Kim
(74) *Attorney, Agent, or Firm* — Greenblum & Bernstein, P.L.C.

(57) ABSTRACT

A vehicle seat includes: a bracket; and a seat frame that is mounted on the bracket through coupling member. The bracket has main body, and upright wall extending upward from the main body and coupled to the main body. The coupling member is mounted at one end on the upright wall with fastening member. The main body is provided with interference avoiding portion that prevents interference with protruding portion of the fastening member protruding from the upright wall toward the main body.

7 Claims, 10 Drawing Sheets

(56) References Cited

U.S. PATENT DOCUMENTS

| | | | | |
|---|---|---|---|---|
| 8,258,413 B2* | 9/2012 | Ito | ............... | G01G 3/1402 |
| | | | | 177/136 |
| 8,864,093 B2* | 10/2014 | Nagura | ............... | B60N 2/08 |
| | | | | 248/429 |
| 9,038,487 B2* | 5/2015 | Ozawa | ............... | G01G 19/4142 |
| | | | | 73/862.621 |
| 9,121,748 B2* | 9/2015 | Ozawa | ............... | B60N 2/002 |
| 9,151,644 B2* | 10/2015 | Ozawa | ............... | B60N 2/002 |
| 2002/0179798 A1* | 12/2002 | Fuller | ............... | B60N 2/123 |
| | | | | 248/429 |
| 2003/0084731 A1* | 5/2003 | Muraishi | ............... | B60N 2/06 |
| | | | | 73/849 |

FOREIGN PATENT DOCUMENTS

| | | |
|---|---|---|
| JP | 2004-299612 | 10/2004 |
| JP | 2007-168664 | 7/2007 |
| JP | 2012-66678 | 4/2012 |
| JP | 2013-091344 | 5/2013 |
| JP | 2015-067136 | 4/2015 |
| JP | 2015-223851 | 12/2015 |
| WO | 2012/049725 | 4/2012 |

\* cited by examiner

RELATED ART ness of the load detection sensor 600. On the other hand, using links of different shapes in a case where the load detection sensor 600 is installed and a case
VEHICLE SEAT

INCORPORATION BY REFERENCE

The disclosure of Japanese Patent Application No. 2016-037388 filed on Feb. 29, 2016 including the specification, drawings and abstract is incorporated herein by reference in its entirety.

BACKGROUND

1. Technical Field

The present disclosure relates to a vehicle seat.

2. Description of Related Art

Figure 14:
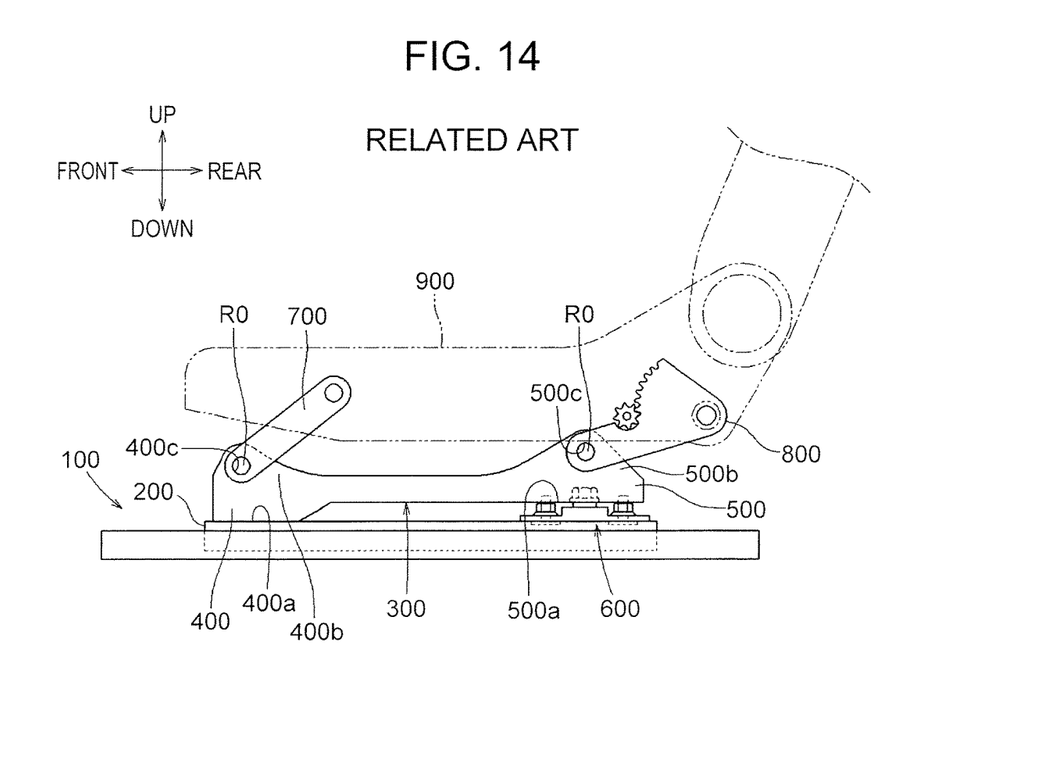
FIG. 14 is a side view showing the major parts of a frame of a vehicle seat in the related art.

A vehicle seat equipped with a load detection device that detects a load applied from an occupant sitting on the seat is known. For example, the technology disclosed in Japanese Patent Application Publication No. 2012-66678 involves a load detection sensor interposed between a slide rail fixed to a car floor and a bracket supporting a car seat. Specifically, as shown in FIG. 14, a bracket 300 extending in the front-rear direction is disposed with a flat part 400a at a front-side end 400 thereof in contact with a top surface of an upper rail 200 of a slide rail 100 extending in the front-rear direction and fixed to the car floor. At a rear-side end 500 of the bracket 300, a load detection sensor 600 is installed between a lower surface of a flat part 500a of the bracket 300 and the top surface of the upper rail 200. A flange 400b extending upward is provided upright along a portion of a peripheral edge of the flat part 400a at the front-side end 400 of the bracket 300, and a mounting hole 400c in which a front link 700 is rotatably supported at the lower end is formed in the flange 400b. A flange 500b extending upward is provided upright along a portion of a peripheral edge of the flat part 500a at the rear-side end 500 of the bracket 300, and a mounting hole 500c in which a rear link 800 is rotatably supported at the lower end is formed in the flange 500b. The front link 700 and the rear link 800 are rotatably mounted at the lower end in the mounting hole 400c and the mounting hole 500c, respectively, with rivets R0. The front link 700 and the rear link 800 are rotatably mounted at the upper end on a cushion frame 900.

SUMMARY

In the technology described in JP 2012-66678 A, cross-sections formed by the flat parts 400a, 500a and the flanges 400b, 500b of the bracket 300 have substantially an L-shape. Accordingly, it is required that the centers of the mounting hole 400c and the mounting hole 500c provided in the flanges 400b, 500b be located above the upper surfaces of the flat parts 400a, 500a of the bracket 300, at least by a distance longer than the radius of the head of the rivet R0. Thus, if the load detection sensor 600 is installed between the lower surface of the flat part 500a at the rear-side end 500 of the bracket 300 and the top surface of the upper rail 200, the positions of the mounting hole 400c and the mounting hole 500c are shifted upward by the thickness in the up-down direction of the load detection sensor 600. Using links of the same shape in both a case where the load detection sensor 600 is installed and a case where the load detection sensor 600 is not installed therefore requires the height of the entire car seat to be raised by the thickness in the up-down direction of the load detection sensor 600. On the other hand, using links of different shapes in a case where the load detection sensor 600 is installed and a case where the load detection sensor 600 is not installed causes an increase in number of the components.

The present disclosure provides a vehicle seat in which an increase in height of the seat surface is avoided without adding to the number of the components.

A vehicle seat according to a first aspect of the present disclosure includes: a bracket; and a seat frame that is mounted on the bracket through coupling member. The bracket has main body extending in a horizontal direction, and upright wall extending upward from the main body and coupled to the main body. The coupling member is mounted at one end on the upright wall with fastening member extending in a direction in which the upright wall and the coupling member overlap each other. The upright wall is coupled to the main body so that the fastening member is located so as to at least partially overlap the main body in a height direction. The main body is provided with interference avoiding portion that prevents interference with protruding portion of the fastening member protruding from the upright wall toward the main body.

According to the above aspect, the coupling member is mounted at one end on the upright wall with the fastening member. The upright wall is coupled to the main body so that the fastening member is located so as to partially overlap the main body in the height direction. Thus, the upright wall is disposed on the lower side relative to the main body and accordingly the height position of the one end of the fastening member provided on the upright wall can be lowered, compared with when the upright wall is disposed relative to the main body so as to form an L-shaped cross-section and the fastening member is provided on this upright wall. The main body is provided with the interference avoiding portion that prevents interference with the protruding portion of the fastening member protruding from the upright wall toward the main body. Thus, the fastening member will not interfere with the main body even when the height position of the fastening member relative to the main body is lowered. These features in combination eliminate the need for moving the height position of the fastening member upward according to an increase in height position of the main body by the thickness of a component such as a load detection sensor interposed between the vehicle floor and the bracket. Thus, a vehicle seat can be provided which allows the same coupling member to be used for specifications including mounting of a component such as a load detection sensor and specifications not including mounting of that component, and in which an increase in height of the seat surface is avoided without adding to the number of the components.

In the above aspect, to couple the upright wall to the main body, at least horizontal surface of the main body and horizontal surface of the upright wall may be coupled together.

According to this configuration, a load applied through the coupling member to the upright wall is efficiently transferred to the main body.

In the above configuration, the upright wall may have bent portion that is bent in an extension direction of the fastening member and coupled to the horizontal surface of the main body.

According to this configuration, the upright wall has the bent portion that is bent in the extension direction of the fastening member and coupled to the horizontal surface of the main body. Thus, the verticality of the upright wall relative to the main body is easy to maintain, so that the seat frame can be securely supported through the coupling member.

In the above aspect, the interference avoiding portion may be a notch provided in the main body.

According to this configuration, the notch that prevents interference with the fastening member can be provided in the main body. Thus, such a simple structure allows the fastening member to be disposed at lower position while avoiding interference between the main body and the fastening member.

In the above aspect, the interference avoiding portion may be a bulge provided on the upright wall and bulging in a direction away from the main body.

According to this configuration, the bulge bulging in a direction away from the main body can be provided on the upright wall to prevent the protruding portion from interfering with the main body. Thus, such a simple structure allows the fastening member to be disposed at lower position while avoiding interference between the main body and the fastening member.

In the above aspect, the bracket may be mounted on a vehicle floor through a slide rail; the slide rail may include an upper rail that is combined with a lower rail fixed to the vehicle floor so that the upper rail is slidable over the lower rail; and the main body of the bracket may be mounted on the upper rail through a sensor such as a load detection sensor. The sensor may be a load detection sensor.

According to this configuration, a vehicle seat can be provided which eliminates the need for moving the position of the fastening member upward by the thickness of a sensor such as a load detection sensor interposed between the upper rail of the slide rail and the bracket, and in which an increase in height of the seat surface is thus avoided without adding to the number of the components.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

FIG. 1 to FIG. 12 show one embodiment of the present disclosure. This embodiment is an example in which the present disclosure is applied to an automobile seat. In the drawings, the arrows indicate the directions of the automobile when the automobile seat is mounted in the automobile. Hereinafter, descriptions related to the directions will be made on the basis of these directions.

Figure 1:
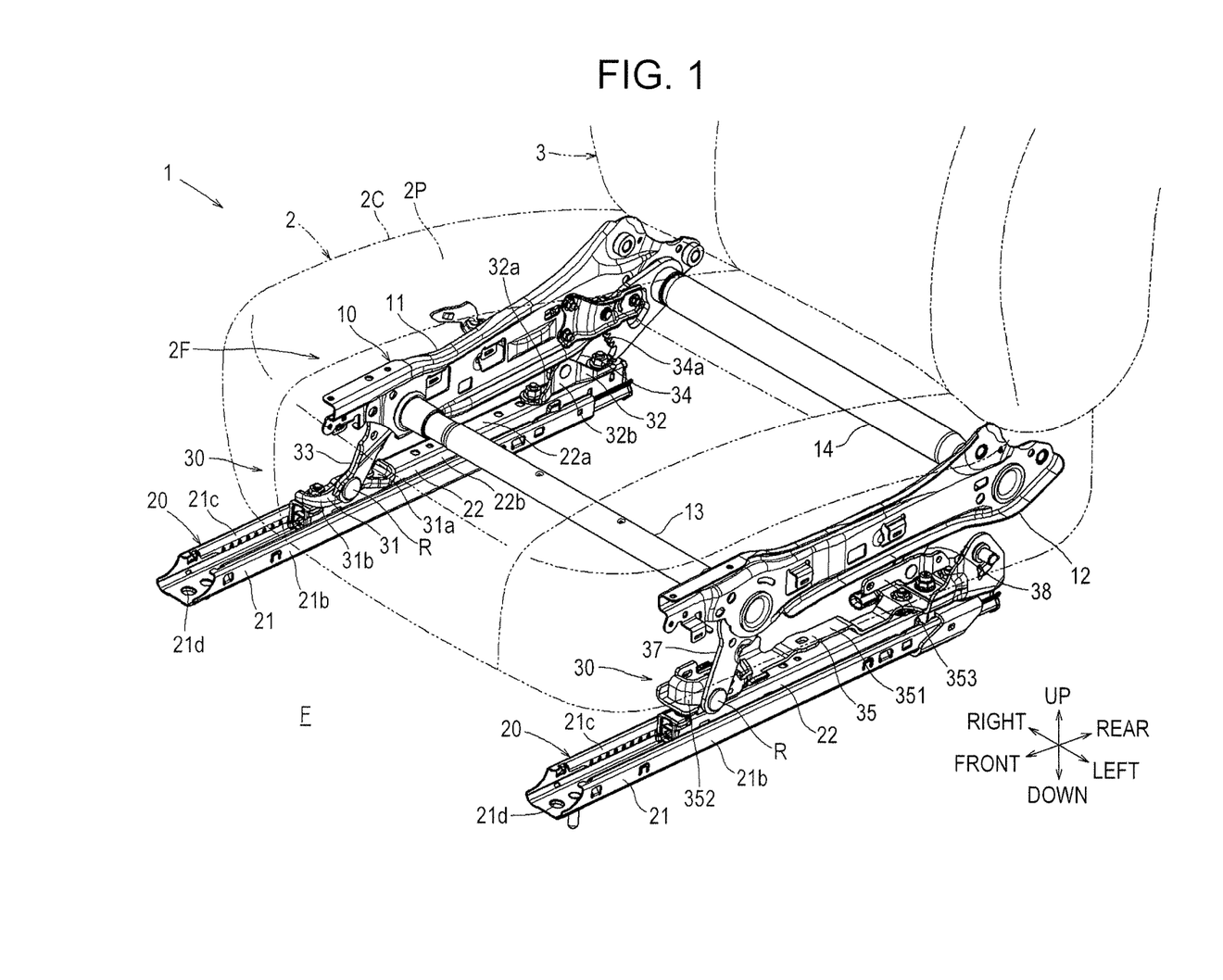
FIG. 1 is a perspective view showing the major parts of a frame of a vehicle seat that is one embodiment of the present disclosure.

As shown in FIG. 1, an automobile seat 1 according to this embodiment has a seat cushion 2 for an occupant to sit on, and a seat back 3 serving as a backrest. The seat cushion 2 has a cushion frame 2F forming a skeleton, a cushion pad 2P as a cushion material placed on the cushion frame 2F, and a cushion cover 2C as a cover material put on the surface of the cushion pad 2P. The outline of the cushion cover 2C put on the cushion pad 2P constitutes the outline of the seat cushion 2, and in FIG. 1 the outline of the seat cushion 2 is indicated by the two-dot dashed lines. The lower side of the seat back 3 is mounted on the rear side of the seat cushion 2 through a recliner (not shown), so that the inclination angle of the seat back 3 relative to the seat cushion 2 is adjustable. The seat cushion 2 will be described below while the description of the seat back 3, which is of a publicly-known configuration, will be omitted. Here, the automobile seat 1 is an example of the "vehicle seat" in the claims.

The cushion frame 2F of the seat cushion 2 has a frame body 10 having a substantially rectangular shape when seen from above, slide rails 20 coupled to a floor F and extending in the front-rear direction, and a lifter 30 with which the frame body 10 is mounted on the slide rails 20 so that the frame body 10 can be moved upward and downward.

As shown in FIG. 1, the basic framework of the frame body 10 is formed by a right side frame 11 and a left side frame 12, extending in the front-rear direction on the right and left sides of the seat, coupled together at the front side with a cylindrical front pipe 13 and at the rear side with a cylindrical rear pipe 14. The right side frame 11 and the left side frame 12 are long plate-like pressed components extending in the front-rear direction, and are each provided at the upper end and the lower end with a flange extending toward the outer side of the seat. The front pipe 13 and the rear pipe 14 are rotatably mounted to the right side frame 11 and the left side frame 12. A lower arm (not shown) is mounted on an upper part of the rear end of each of the right side frame 11 and the left side frame 12, and the lower end of a back frame (not shown) is mounted on each lower arm through the recliner (not shown). Here, the frame body 10 is an example of the "seat frame" in the claims.

Figure 4:
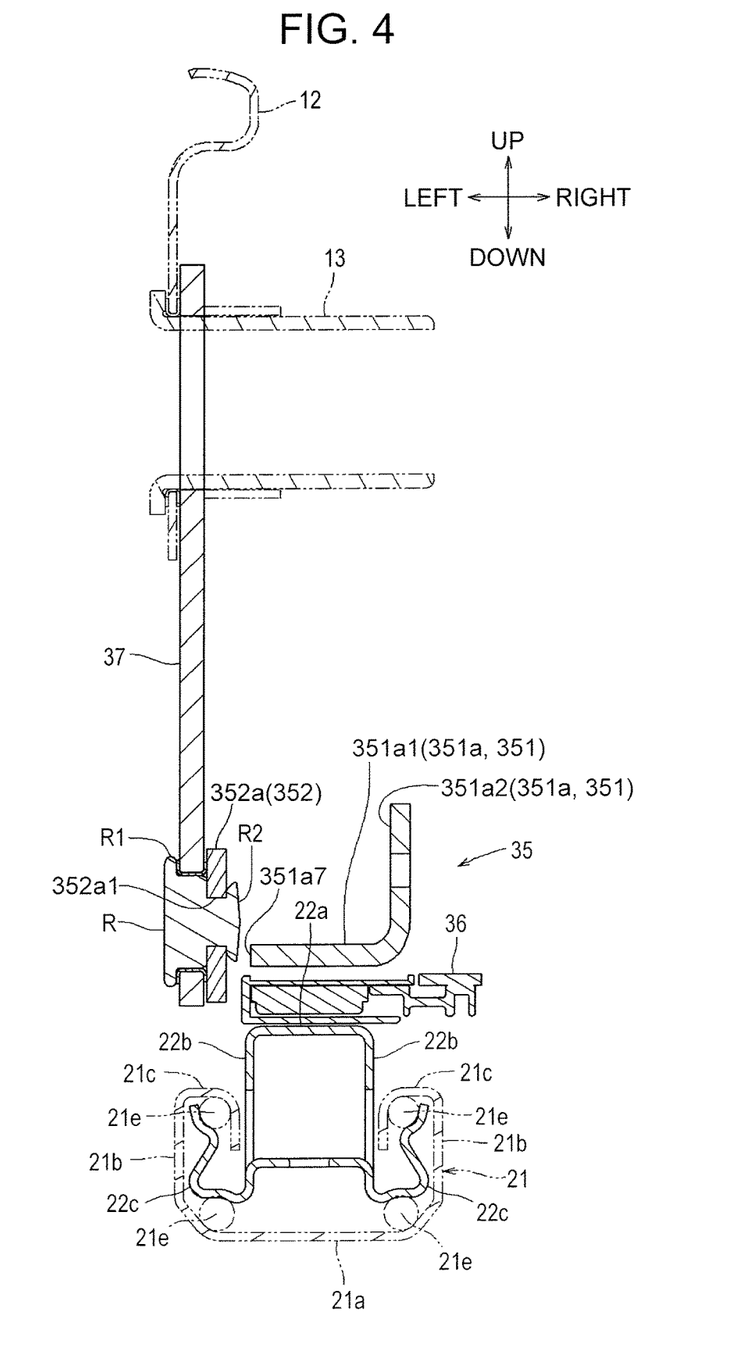
FIG. 4 is a sectional view taken along the line IV-IV of FIG. 2.
Figure 5:
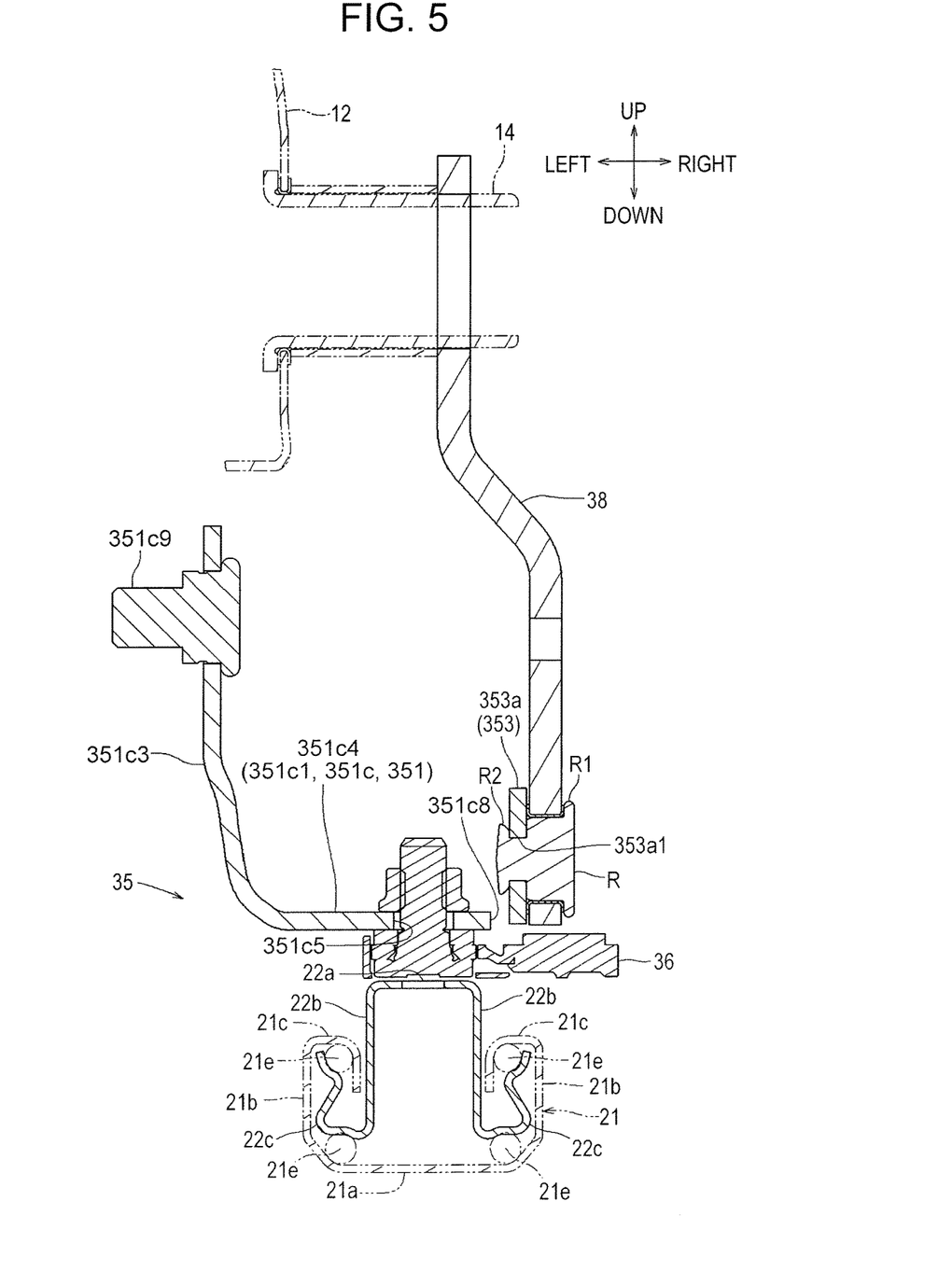
FIG. 5 is a sectional view taken along the line V-V of FIG. 2.

As shown in FIG. 1, the slide rail 20 is a component of which an upper rail 22 is combined with a lower rail 21 coupled to the floor F so that the upper rail 22 is slidable over the lower rail 21. As shown in FIG. 1, FIG. 4, and FIG. 5, the lower rail 21 is a member with a constant cross-section having a bottom surface 21a, side surfaces 21b, and downward folds 21c. The lower rail 21 is fastened and fixed to the floor F with bolts that are passed through a bolt hole 21d bored at the front end of the bottom surface 21a and a bolt hole (not shown) bored at the rear end thereof. The upper rail 22 is a member with a constant cross-section having an upper surface 22a, side surfaces 22b, and upward folds 22c. The basic cross-sectional shape of the upper rail 22 is an inverted U-shape opening downward that is formed by the upper surface 22a and the side surfaces 22b, and the upper rail 22 is combined with the lower rail 21 so that the side surfaces 22b and the upward folds 22c are fitted with the side surfaces 21b and the downward folds 21c of the lower rail 21. Balls 21e as rolling members are inserted between the upper rail 22 and the lower rail 21 to reduce the slide resistance.

As shown in FIG. 1, a front bracket 31 and a rear bracket 32 are coupled respectively on the front end side and the rear end side of the upper surface 22a of the right-side upper rail 22. The front bracket 31 is a plate-like member having a bottom wall 31a extending in the front-rear direction, and side walls 31b integrally provided upright on the bottom wall 31a so as to extend upward from the front-side end, left-side end, and rear-side end of the bottom wall 31a. The bottom wall 31a has a substantially rectangular shape when seen from above, with the long side extending in the front-rear direction and the short side extending in the left-right direction, to about the same extent as the length in the left-right direction of the upper surface 22a of the upper rail 22. A corner on the front left side and a corner on the rear left side of the bottom wall 31a are rounded to a radius of about the same length as the length in the left-right direction of the upper surface 22a of the upper rail 22. Bolt holes for fastening the front bracket. 31 with bolts to the upper surface 22a of the upper rail 22 are provided respectively on the front side and the rear side of the bottom wall 31a. A right front link 33, which is a plate-like member to be described later, is supported at the lower end with a rivet R on a left side part, closer to the front side, of an unrounded part of the side wall 31b so that the right front link 33 is rotatable in the up-down direction.

The rear bracket 32 is a plate-like member having a bottom wall 32a extending in the front-rear direction, and a side wall 32b provided upright at the left-side end of the bottom wall 32a so as to extend upward. The bottom wall 32a has a substantially rectangular shape when seen from above, with the long side extending in the front-rear direction and the short side extending in the left-right direction to about the same extent as the length in the left-right direction of the upper surface 22a of the upper rail 22. Bolt holes for fastening the rear bracket 32 with bolts to the upper surface 22a of the upper rail 22 are provided respectively on the front side and the rear side of the bottom wall 33a. A right rear link 34, which is a plate-like member to be described later, is supported at the lower end with the rivet R near the center in the front-rear direction of the side wall 32b so that the right rear link 34 is rotatable in the up-down direction.

Figure 2:
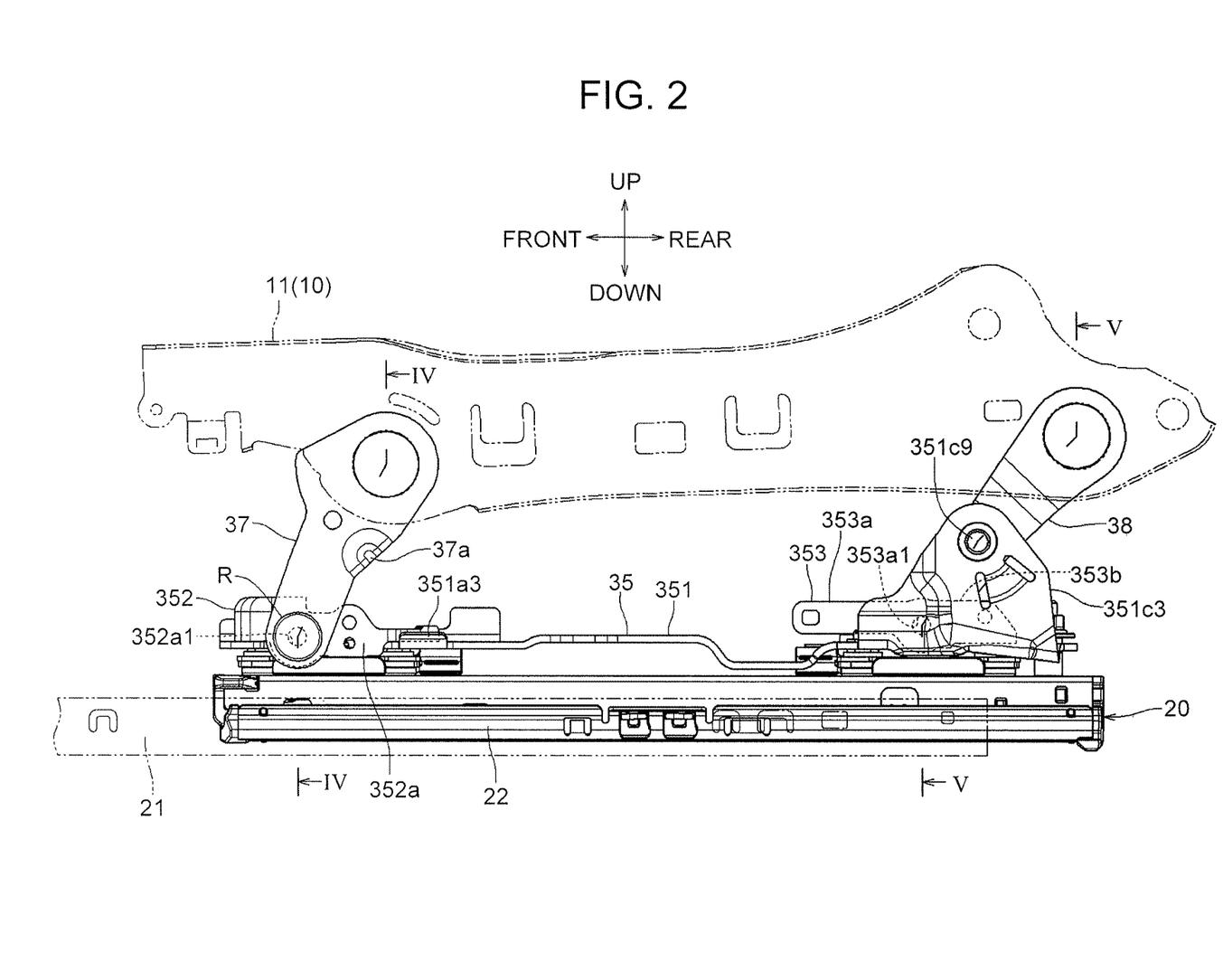
FIG. 2 is a side view showing the major parts of the frame in the embodiment, with a side frame and a lower rail indicated by two-dot dashed lines.
Figure 3:
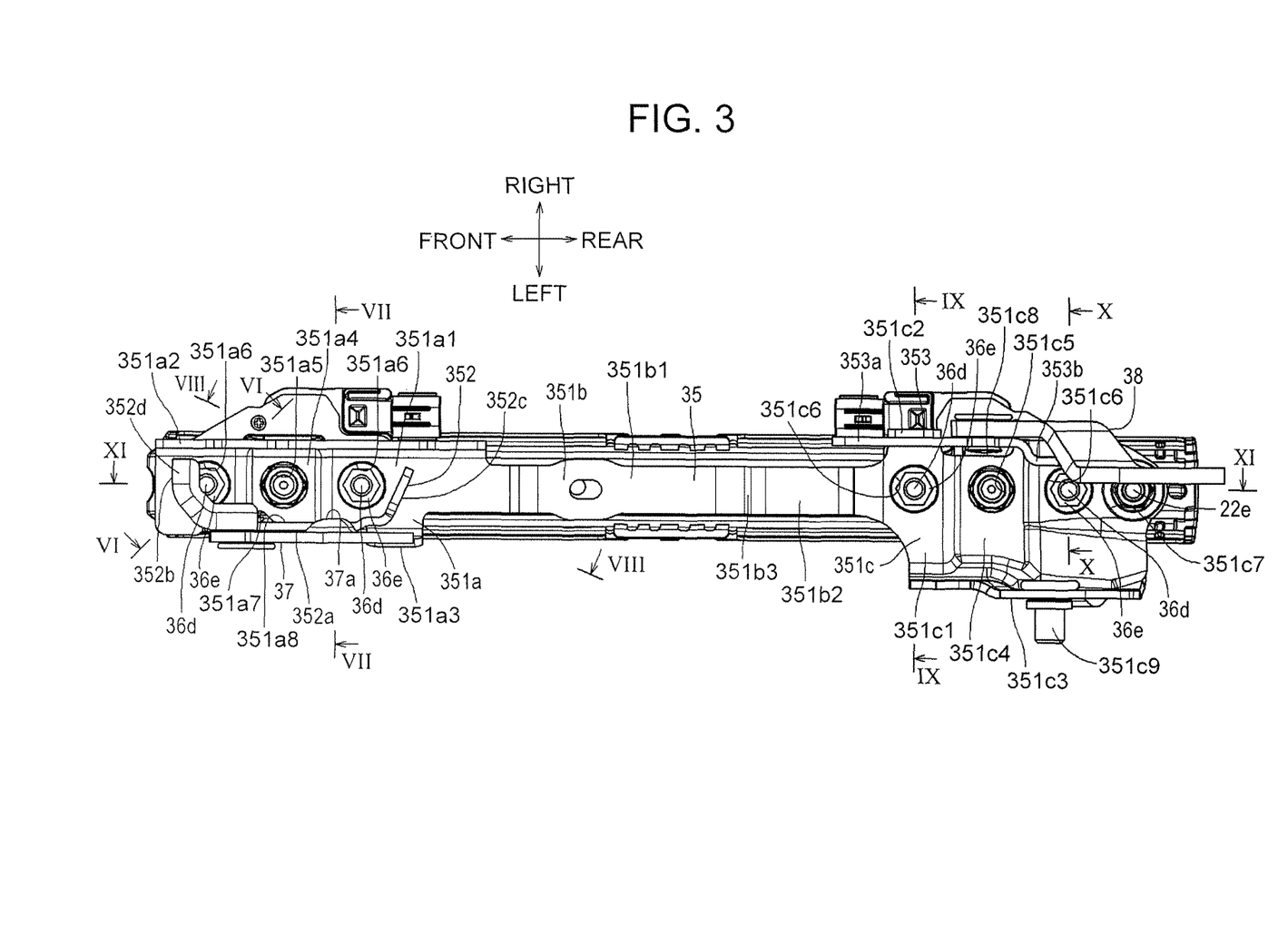
FIG. 3 is a plan view showing the major parts of the frame in the embodiment, with the side frame and the lower rail omitted.
Figure 12:
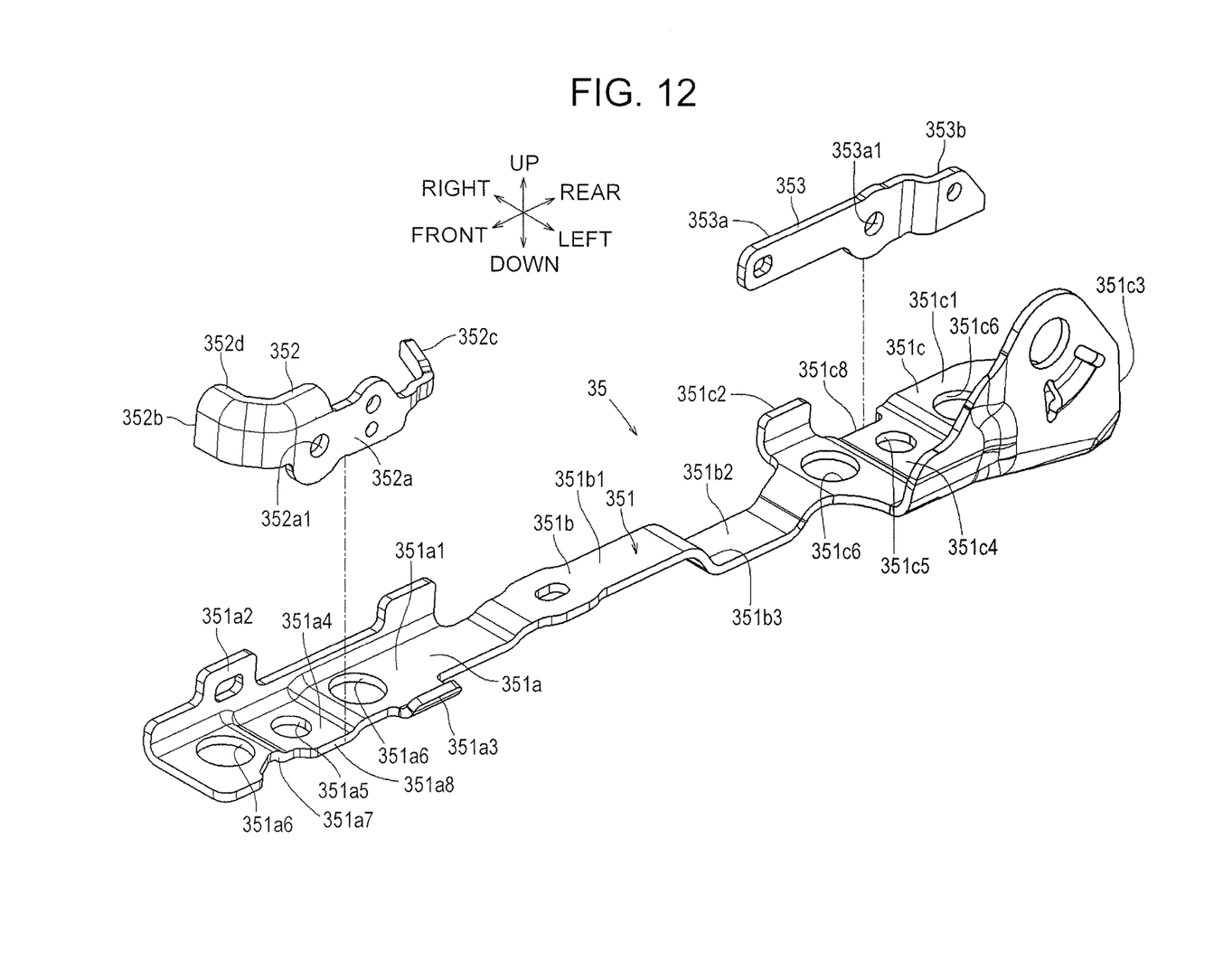
FIG. 12 is an exploded perspective view of an integral bracket.

As shown in FIG. 1 to FIG. 5, an integral bracket 35 extending from the front end side to the rear end side of the left-side upper rail 22 is coupled through a load detection sensor 36, to be described later, to the upper surface 22a of the left-side upper rail 22. The integral bracket 35 mainly has a first part 351 that is a plate-like member formed by a surface extending in the front-rear direction along the upper surface 22a of the upper rail 22, a front-side second part 352 extending in the up-down direction on the front side of the first part 351, and a rear-side second part 353 extending in the up-down direction on the rear side of the first part 351. As shown in FIG. 3 and FIG. 12, the first part 351 has a front first portion 351a, an intermediate first portion 351b, and a rear first portion 351c in this order from the front side as seen from above. When seen from above, the length in the front-rear direction of the front first portion 351a is slightly shorter than a third of the length in the front-rear direction of the first part 351, and the length in the left-right direction of the front first portion 351a is about 1.5 times the length in the left-right direction of the upper surface 22a of the upper rail 22. When seen from above, the length in the front-rear direction of the intermediate first portion 351b is slightly shorter than a half of the length in the front-rear direction of the first part 351, and the length in the left-right direction of the intermediate first portion 351b is roughly equal to the length in the left-right direction of the upper surface 22a of the upper rail 22. When seen from above, the length in the front-rear direction of the rear first portion 351c is slightly shorter than a third of the length in the front-rear direction of the first part 351, and the length in the left-right direction of the rear first portion 351c is slightly shorter than three times the length in the left-right direction of the upper surface 22a of the upper rail 22. Here, the integral bracket 35 is an example of the "bracket" in the claims.

As shown in FIG. 2, FIG. 3, and FIG. 12, the front first portion 351a has a bottom wall 351a1 extending parallel to the upper surface 22a of the upper rail 22, a right-side wall 351a2 extending upward from the right-side end of the bottom wall 351a1, and a left-side wall 351a3 extending upward from the left-side end of the bottom wall 351a1. The right-side wall 351a2 serves to enhance the bending rigidity of the bottom wall 351a1. The left-side wall 351a3 serves to stop rotation of a left front link 37, to be described later, by allowing a protrusion 37a of the left front link 37 to come in contact therewith, and serves also to enhance the bending rigidity of the bottom wall 351a1. A sensor mounting portion 351a4 that is slightly recessed downward and extends parallel to the upper surface 22a of the upper rail 22 is provided roughly at the center in the front-rear direction of the bottom wall 351a1, and a sensor fastening hole 351a5 is formed at the center of the sensor mounting portion 351a4. The bottom walls 351a1 on the front and rear sides of the sensor mounting portion 351a4 are each provided with a bolt interference avoiding hole 351a6 through which a bolt 36d and a nut 36e that couple the load detection sensor 36, to be described later, to the upper surface 22a of the upper rail 22 are passed in a non-interference state. A notch 351a7 recessed toward the right side is provided in a left side surface of the bottom wall 351a1, between the sensor fastening hole 351a5 and the front-side bolt interference avoiding hole 351a6. In other words, the notch 351a7 is provided so as to extend from the bottom wall 351a1 on the front side of the sensor mounting portion 351a4 to the sensor mounting portion 351a4. A coupling wall 351a8 extending in the front-rear direction is formed adjacent to the rear side of the notch 351a7, in the left side surface of the sensor mounting portion 351a4. As will be described later, the notch 351a7 serves to prevent an upset part R2 of the rivet R that rotatably couples the left front link 37 at the lower end side to the front-side second part 352 from interfering with the bottom wall 351a1 of the first part 351. The coupling wall 351a8 serves so that, when the front-side second part 352 is fixed by welding to the bottom wall 351a1 of the first part 351, the front-side second part 352 is positioned and welded by being brought in contact with the coupling wall 351a8. Here, the left front link 37 and the bottom wall 351a1 are examples of the "coupling member" and the "main body", respectively, in the claims.

As shown in FIG. 2, FIG. 3, and FIG. 12, the rear first portion 351c has a bottom wall 351c1 extending parallel to the upper surface 22a of the upper rail 22, a right-side wall 351c2 extending upward from the right-side front end of the bottom wall 351c1, and a left-side wall 351c3 extending upward from the left-side end of the bottom wall 351c1. The right-side wall 351c2 is a side wall part extending to about the same height as the right-side wall 351a2 and the left-side wall 351a3 of the front first portion 351a, and serves to enhance the bending rigidity of the bottom wall 351c1 as well as to couple the rear-side second part 353. The height of the left-side wall 351c3 extending upward is about five times the height of the right-side wall 351c2, and the left-side wall 351c3 has a substantially triangular shape when seen from one side. Provided upright at the upper end side with a bolt 351c9 that fixes a belt anchor, the left-side wall 351c3 serves to enhance the bending rigidity as well as to support the bolt 351c9. A sensor mounting portion 351c4 that is slightly recessed downward and extends parallel to the upper surface 22a of the upper rail 22 is provided at the center in the front-rear direction, somewhat closer to the front side, of the bottom wall 351c1, and a sensor fastening hole 351c5 is formed at the center of the sensor mounting portion 351c4. The bottom walls 351c1 on the front and rear sides of the sensor mounting portion 351c4 are each provided with a bolt interference avoiding hole 351c6 through which the bolt 36d and the nut 36e that couple the load detection sensor 36, to be described later, to the upper surface 22a of the upper rail 22 are passed in a non-interference state. On the rear side of the rear-side bolt interference avoiding hole 351c6, a deformation prevention bolt hole 351c7 is provided through which a deformation prevention bolt 22e is passed that prevents significant deformation of the integral bracket 35 when an excessively large load is applied from a seatbelt to the bolt 351c9 upon a rear collision of the automobile. A notch 351c8 recessed toward the left side is provided in a right side surface of the bottom wall 351c1, between the sensor fastening hole 351c5 and the front-side bolt interference avoiding hole 351c6. In other words, the notch 351c8 is provided so as to extend from the bottom wall 351c1 on the front side of the sensor mounting portion 351c4 to the sensor mounting portion 351c4. As will be described later, the notch 351c8 serves to prevent the upset part R2 of the rivet R that rotatably couples a left rear link 38 at the lower end side to the rear-side second part 353 from interfering with the first part 351. Here, the left rear link 38 and the bottom wall 351c1 are examples of the "coupling member" and the "main body", respectively, in the claims.

As shown in FIG. 2, FIG. 3, and FIG. 12, the intermediate first portion 351b is a portion coupling together the rear end of the bottom wall 351a1 of the front first portion 351a and the front end of the bottom wall 351c1 of the rear first portion 351c. The length in the left-right direction of the intermediate first portion 351b is substantially equal to the length in the left-right direction of the upper surface 22a of the upper rail 22. On the front side of the intermediate first portion 351b, a raised surface 351b1 is formed that is located somewhat above the rear end of the bottom wall 351a1 of the front first portion 351a and extends parallel to the upper surface 22a of the upper rail 22. On the rear side of the intermediate first portion 351b, a depressed surface 351b2 is formed that is located somewhat below the front end of the bottom wall 351c1 of the rear first portion 351c and extends parallel to the upper surface 22a of the upper rail 22. The raised surface 351b1 and the depressed surface 351b2 integrally form the intermediate first portion 351b by being smoothly coupled together through an inclined surface 351b3 that descends from the rear end of the raised surface 351b1 toward the rear side.

As shown in FIG. 2, FIG. 3, and FIG. 12, the front-side second part 352 is a plate member curved substantially in a C-shape when seen from above. The length in the front-rear direction of the front-side second part 352 is slightly shorter than the length in the front-rear direction of the front first portion 351a, and the length in the left-right direction of the front-side second part 352 is roughly equal to the length in the left-right direction of the upper surface 22a of the upper rail 22. Specifically, the front-side second part 352 has a side plate 352a that stands perpendicular to the bottom wall 351a1 and extends in the front-rear direction when coupled to the front first portion 351a. The front-side second part 352 has also a front plate 352b that stands perpendicular to the bottom wall 351a1 and extends from the front end of the side plate 352a while curving toward the right side. The front-side second part 352 further has a rear plate 352c that stands perpendicular to the bottom wall 351a1 and extends from the rear end of the side plate 352a while bending toward the right side. As shown in FIG. 2, when seen from one side, the length in the up-down direction of the side plate 352a is longer at the front-side part and shorter at the rear-side part (with the length at the rear-side part being about a third of the length of the front-side part), and a rivet engaging hole 352a1 is provided near the center in the up-down direction of the front-side part. As shown in FIG. 4, the lower end of the rivet engaging hole 352a1 is located roughly at the same position in the up-down direction as the upper surface of the bottom wall 351a1 of the front first portion 351a, while the lower end of the side plate 352a is located at a position on the lower side of the lower surface of the bottom wall 351a1. Thus, the relation between the height positions of the rivet R and the bottom wall 351a1 is such that, when seen from one side, a head R1 and the upset part R2 of the rivet R partially overlap the bottom wall 351a1 of the front first portion 351a. Accordingly, the notch 351a7 of the bottom wall 351a1 is provided at a portion corresponding to the rivet engaging hole 352a1 of the front-side second part 352, so that the upset part R2 of the rivet R does not partially interfere with the bottom wall 351a1 when the front-side second part 352 is coupled to the front first portion 351a. A flange 352d is provided that extends toward the inner side of the seat, from the upper end of the front-side part of the side plate 352a to the upper end of the front plate 352b. The flange 352d serves to enhance the rigidity in the front-rear and left-right directions of the front-side second part 352. The rear plate 352c has the same length in the up-down direction as the rear-side part of the side plate 352a. The rear plate 352c also serves to enhance the rigidity in the front-rear and left-right directions of the front-side second part 352. Here, the front-side second part 352 is an example of the "upright wall" in the claims, and the front plate 352b and the rear plate 352c are examples of the "bent portions" in the claims.

As shown in FIG. 2, FIG. 3, and FIG. 12, the rear-side second part 353 is a plate-like member bent in a substantially crank shape when seen from above. The length in the front-rear direction of the rear-side second part 353 is roughly equal to the length in the front-rear direction of the rear first portion 351c, and the length in the left-right direction of the rear-side second part 353 is about a half of the length in the left-right direction of the upper surface 22a of the upper rail 22. Specifically, the rear-side second part 353 has a front-side plate 353a that stands perpendicular to the bottom wall 351c1 and extends in the front-rear direction when coupled to the rear first portion 351c. The rear-side second part 353 also has a rear-side plate 353b that stands perpendicular to the bottom wall 351c1 and extends from the rear end of the front-side plate 353a, bends toward the left side and then toward the rear side, and extends parallel to the front-side plate 353a toward the rear side. The length in the front-rear direction of the front-side plate 353a is slightly longer than twice the length in the front-rear direction of the rear-side plate 353b. As shown in FIG. 2, when seen from one side, the length in the up-down direction of the front-side plate 353a is shorter at the front-side part and longer at the rear-side part, and a rivet engaging hole 353a1 is provided near the center in the up-down direction of the rear-side part. As shown in FIG. 5, the lower end of the rivet engaging hole 353a1 is located in the up-down direction somewhat above the upper surface of the sensor mounting portion 351c4 of the bottom wall 351c1 of the rear first portion 351c, while the lower end of the front-side plate 353a is located in the up-down direction between the upper surface and the lower surface of the sensor mounting portion 351c4. In other words, the relation between the height positions of the rivet R and the bottom wall 351c1 is such that, when seen from one side, the head R1 of the rivet R partially overlaps the bottom wall 351c1 of the rear first portion 351c. However, this relation is such that, when seen from one side, the upset part R2 of the rivet R does not overlap the bottom wall 351c1 of the rear first portion 351c. If the rear-side second part 353 were integral with the bottom wall 351c1 of the rear first portion 351c, the rivet R would fail to be appropriately fastened as the head R1 of the rivet R partially overlaps the round part formed between the bottom wall 351c1 and the side plate 353a while the rivet R is joined to the side plate 353a. For this reason, the rear-side second part 353 is provided separately from the rear first portion 351c, and the bottom wall 351c1 is provided with the notch 351c8 at a portion corresponding to the rivet engaging hole 353a1 of the rear-side second part 353 so that a clearance is left between the bottom wall 351c1 and the side plate 353a when the rear-side second part 353 is coupled to the rear first portion 351c. Moreover, when the rear-side second part 353 is coupled to the rear first portion 351c, the right side surface of the front-side plate 353a comes in contact with the left side surface of the right-side wall 351c2 of the rear first portion 351c, while the bottom surface of the rear-side plate 353b comes in contact with the upper surface of the bottom wall 351c1. Here, the rear-side second part 353 is an example of the "upright wall" in the claims. The rivet R and the rear-side plate 353b are examples of the "fastening member" and the "bent portion", respectively, in the claims.

Figure 6:
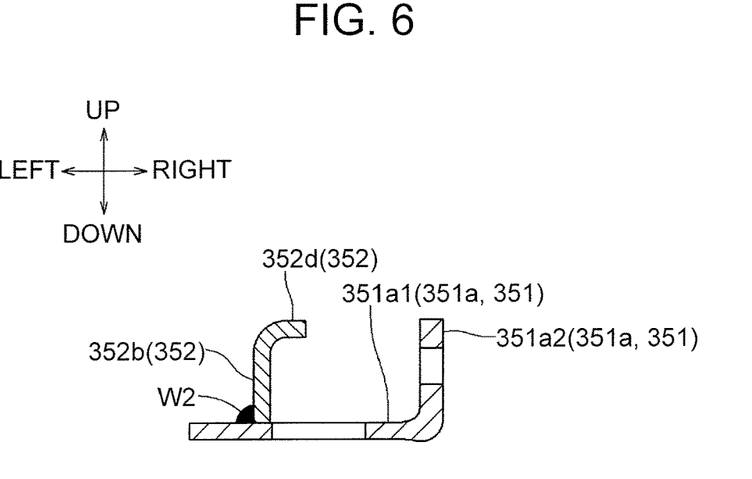
FIG. 6 is a sectional view taken along the line VI-VI of FIG. 3, with an upper rail omitted.
Figure 7:
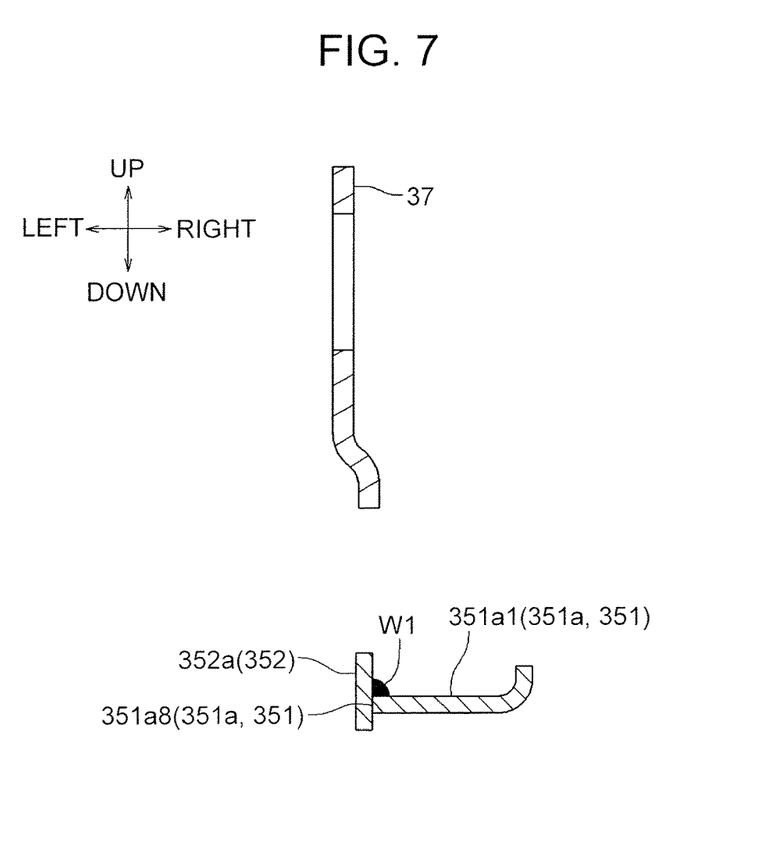
FIG. 7 is a sectional view taken along the line VII-VII of FIG. 3, with the upper rail omitted.
Figure 8:
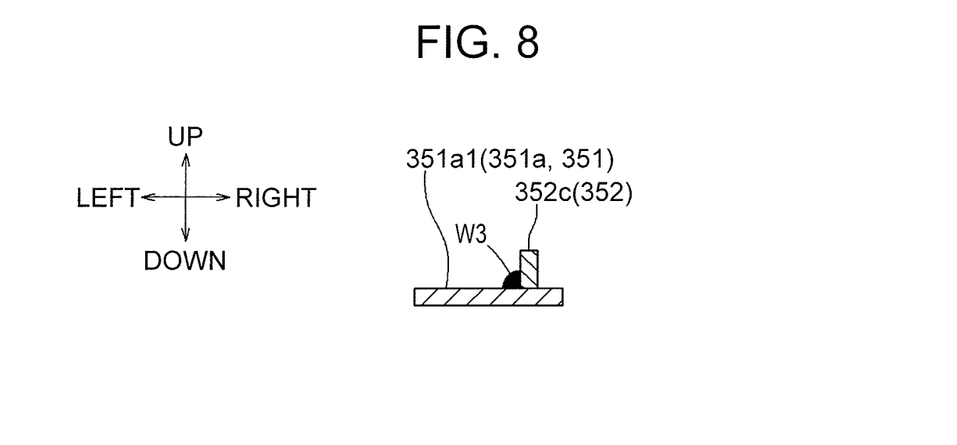
FIG. 8 is a sectional view taken along the line VIII-VIII of FIG. 3, with the upper rail omitted.

As shown in FIG. 2 and FIG. 4, the left front link 37 is a plate-like member, and is coupled at the upper end side to the left end side of the front pipe 13 and rotatably mounted at the lower end side through the rivet R in the rivet engaging hole 352a1 of the side plate 352a of the front-side second part 352. When the cushion frame 2F is formed, the center axis of the rivet engaging hole 352a1 of the left front link 37 and the axis of the rivet R on the lower end side of the right front link 33 coincide with each other. The length of the left front link 37 from the center of the rivet engaging hole 352a1 to the center axis of the front pipe 13 is equal to the length of the right front link 33 from the axis of the rivet R on the lower end side to the center axis of the front pipe 13. The front-side second part 352 is coupled to the front first portion 351a of the integral bracket 35, with the left front link 37 mounted at the lower end side on the front-side second part 352 through the rivet R. As shown in FIG. 6 to FIG. 8, the coupling procedure is as follows. First, the front-side second part 352 is disposed on the front first portion 351a, with the right side surface of the side plate 352a of the front-side second part 352 in contact with the coupling wall 351a8 of the front first portion 351a, and with the lower surface of the front plate 352b and the lower surface of the rear plate 352c of the front-side second part 352 in contact with the upper surface of the bottom wall 351a1 of the front first portion 351a. In this state, welding is performed at a corner W1 formed by the right side surface of the side plate 352a and the upper surface of the bottom wall 351a1, a corner W2 formed by the front side surface of the front plate 352b and the upper surface of the bottom wall 351a1, and a corner W3 formed by the rear side surface of the rear plate 352c and the upper surface of the bottom wall 351a1, to fix the front-side second part 352. During this process, the upset part R2 of the rivet R is partially disposed inside the notch 351a7 of the bottom wall 351a1 so as not to interfere with the bottom wall 351a1. The protrusion 37a protruding toward the right side is provided on the rear side of the left front link 37, near the center in the up-down direction. When the left front link 37 rotates in the clockwise direction around the axis of the rivet R in FIG. 2, the protrusion 37a comes in contact with the upper end of the left-side wall 351a3 of the front first portion 351a to stop the rotation. Thus, the protrusion 37a determines the lower limit of the downward motion of the cushion frame 2F by the lifter 30. Here, the upset part R2 of the rivet R and the notch 351a7 are examples of the "protruding portion" and the "interference avoiding portion", respectively, in the claims. The upper surface of the bottom wall 351a1 and the lower surface of the front plate 352b and the lower surface of the rear plate 352c of the front-side second part 352 are examples of the "horizontal surface of the main body" and the "horizontal surfaces of the upright wall", respectively, in the claims.

Figure 9:
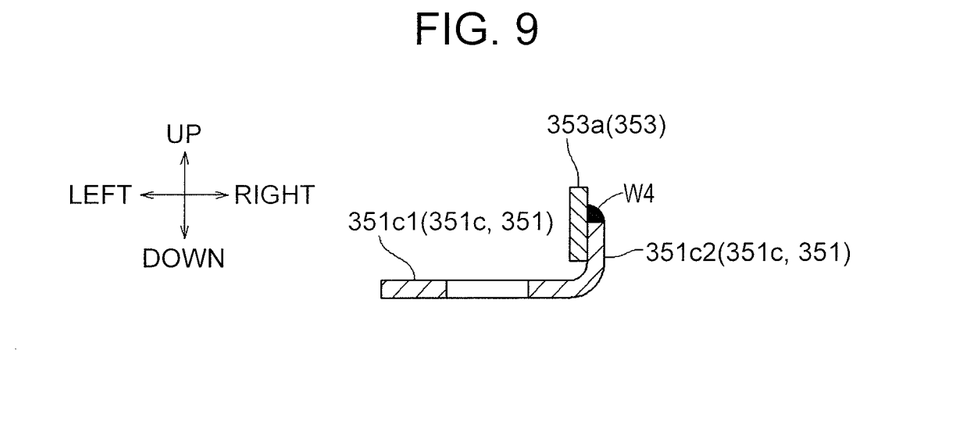
FIG. 9 is a sectional view taken along the line IX-IX of FIG. 3, with the upper rail omitted.
Figure 10:
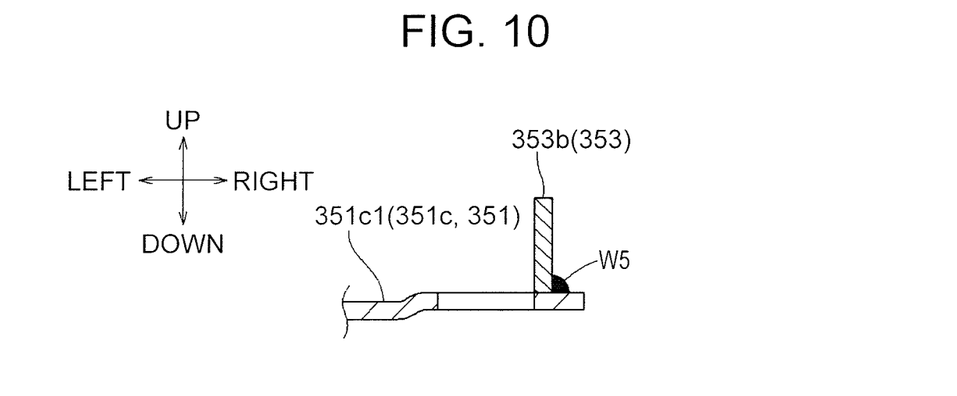
FIG. 10 is a sectional view taken along the line X-X of FIG. 3.

As shown in FIG. 2 and FIG. 5, the left rear link 38 is a plate-like member extending upward while bending toward the left side, and is coupled at the upper end side to the left end side of the rear pipe 14 and rotatably mounted at the lower end side through the rivet R in the rivet engaging hole 353a1 of the front-side plate 353a of the rear-side second part 353. When the cushion frame 2F is formed, the center axis of the rivet engaging hole 353a1 of the left rear link 38 and the axis of the rivet R on the lower end side of the right rear link 34 coincide with each other. The length of the left rear link 38 from the center of the rivet engaging hole 353a1 to the center axis of the rear pipe 14 is equal to the length of the right rear link 34 from the axis of the rivet R on the lower end side to the center axis of the rear pipe 14. The rear-side second part 353 is coupled to the rear first portion 351c of the integral bracket 35, with the left rear link 38 mounted at the lower end side on the rear-side second part 353 through the rivet R. As shown in FIG. 9 and FIG. 10, the coupling procedure is as follows. First, the rear-side second part 353 is disposed on the rear first portion 351c, with the right side surface of the front-side plate 353a of the rear-side second part 353 in contact with the left side surface of the right-side wall 351c2 of the rear first portion 351c, and with the lower surface of the rear-side plate 353b of the rear-side second part 353 in contact with the upper surface of the bottom wall 351c1 of the rear first portion 351c. In this state, welding is performed at a corner W4 formed by the right-side surface of the front-side plate 353a and the upper surface of the right-side wall 351c2 and a corner W5 formed by the right-side surface of the rear-side plate 353b and the upper surface of the bottom wall 351c1 to fix the rear-side second part 353. During this process, the right-side surface of the front-side plate 353a in which the upset part R2 of the rivet R is disposed is disposed so as to be separated from the bottom wall 351c1 by the notch 351c8. Here, the upset part R2 of the rivet R and the notch 351c8 are examples of the "protruding portion" and the "interference avoiding portion", respectively, in the claims. The upper surface of the bottom wall 351*c*1 and the lower surface of the rear-side plate 353*b* of the rear-side second part 353 are examples of the "horizontal surface of the main body" and the "horizontal surface of the upright wall", respectively, in the claims.

Figure 11:
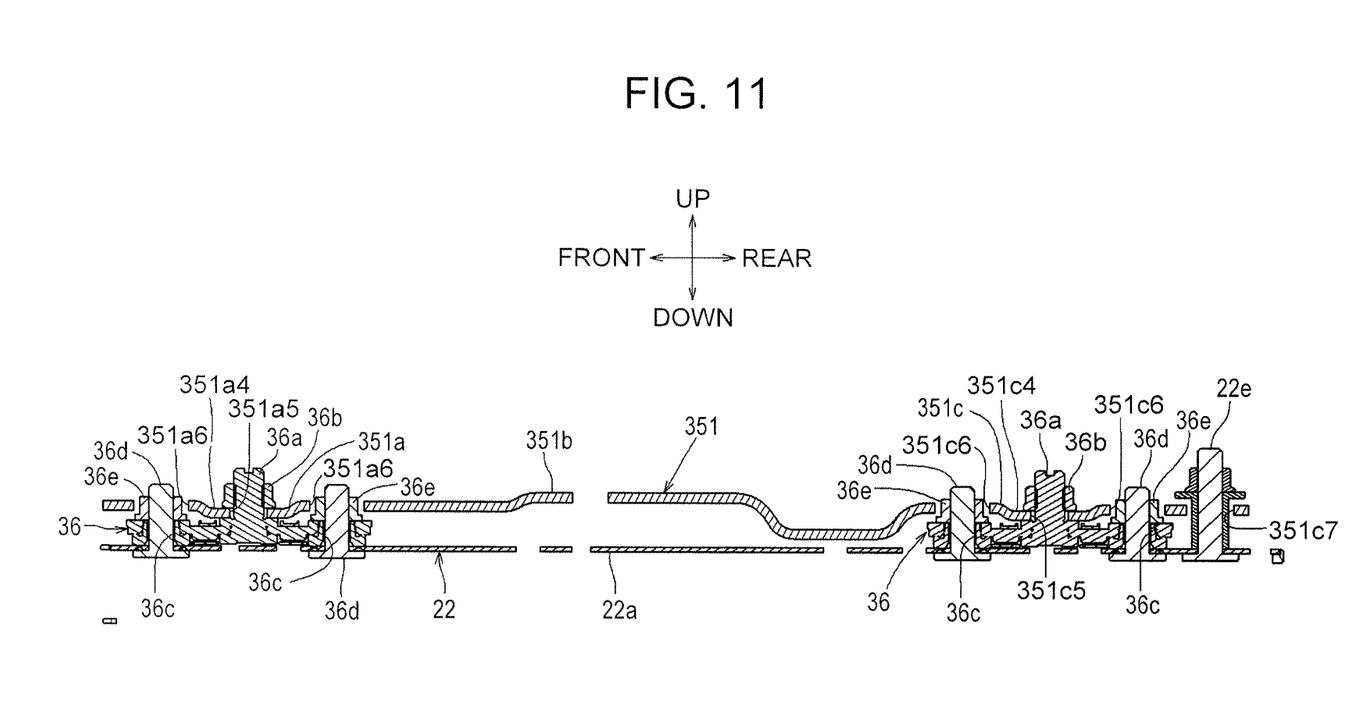
FIG. 11 is a sectional view taken along the line XI-XI of FIG. 3.

As shown in FIG. 4, FIG. 5, and FIG. 11, the load detection sensors 36 are mounted respectively on the front side and the rear side between the left-side upper rail 22 and the integral bracket 35. The main body of the load detection sensor 36 has a rectangular shape when seen from above. The length in the front-rear direction of the load detection sensor 36 is slightly shorter than the length in the front-rear direction of the front first portion 351*a*, and the length in the left-right direction of the load detection sensor 36 is roughly equal to the length in the left-right direction of the upper surface 22*a* of the upper rail 22. As shown in FIG. 11, a bolt 36*a* that couples the integral bracket 35 is provided at the center in the front-rear direction of the main body of the load detection sensor 36, and bolt holes 36*c* through which the bolts 36*d* coupled to the upper surface 22*a* of the upper rail 22 are passed are provided respectively on the front side and the rear side of the bolt 36*a*. The positions of the bolt 36*a* and the two bolt holes 36*c* correspond to the sensor fastening hole 351*a*5 and the bolt interference avoiding hole 351*a*6 of the front first portion 351*a* and to the sensor fastening hole 351*c*5 and the bolt interference avoiding hole 351*c*6 of the rear first portion 351*c*.

The load detection sensor 36 is mounted to the left-side upper rail 22 and the integral bracket 35 as follows. First, the load detection sensors 36 are disposed on the front end side and the rear end side of the upper surface 22*a* of the left-side upper rail 22, and the bolts 36*d* are passed through the bolt holes 36*c* and the nuts 36*e* are fastened to fix the load detection sensors 36. Next, the bolt 36*a* of the front-side load detection sensor 36 is passed through the sensor fastening hole 351*a*5 of the integral bracket 35, and the bolt 36*a* of the rear-side load detection sensor 36 is passed through the sensor fastening hole 351*c*5 of the integral bracket 35, and these bolts are fastened with the nuts 36*b* to fix the load detection sensors 36. In this state, the lower surface of the sensor mounting portion 351*a*4 of the integral bracket 35 comes in contact with a load detection part of the front-side load detection sensor 36 and the lower surface of the sensor mounting portion 351*c*4 of the integral bracket 35 comes in contact with a load detection part of the rear-side load detection sensor 36, thus making the load detection sensors 36 ready for load detection.

The assembly procedure of the cushion frame 2F will be described. First, the frame body 10 is formed by coupling together the right side frame 11 and the left side frame 12, at the front side with the cylindrical front pipe 13 and at the rear side with the cylindrical rear pipe 14, so as to allow relative rotation of these side frames. The front bracket 31 is coupled with the rivet R to the lower end of the right front link 33 so as to allow relative rotation of the right front link 33, and the rear bracket 32 is coupled with the rivet R to the lower end of the right rear link 34 so as to allow relative rotation of the right rear link 34. The front-side second part 352 is coupled with the rivet R to the lower end of the left front link 37 so as to allow relative rotation of the left front link 37, and the rear-side second part 353 is coupled with the rivet R to the lower end of the left rear link 38 so as to allow relative rotation of the left rear link 38. The front-side second part 352 and the rear-side second part 353 are coupled to the first part 351 by welding as described above. In this state, the right front link 33 and the left front link 37 are coupled at the upper end side respectively to the right end side and the left end side of the front pipe 13 by welding.

The right rear link 34 and the left rear link 38 are coupled at the upper end side respectively to the right end side and the left end side of the rear pipe 14 by welding. Before the right rear link 34 is coupled at the upper end side to the right end side of the rear pipe 14 by welding, a sector gear 34*a* is mounted on the inner side of the seat on the right end side of the rear pipe 14. Thereafter, a pinion gear (not shown) that rotates the sector gear 34*a* relative to the right side frame 11 and a drive mechanism (not shown) for the pinion gear are mounted on the right side frame 11. Finally, the front bracket 31 and the rear bracket 32 are mounted with bolts and nuts to the upper surface 22*a* of the upper rail 22 of the right-side slide rail 20. In a state where the load detection sensors 36 are mounted on the upper surface 22*a* of the upper rail 22 of the left-side slide rail 20, the nuts 36*b* are fastened to fix the integral bracket 35. Specifically, the bolt 36*a* of the front-side load detection sensor 36 mounted on the upper surface 22*a* of the upper rail 22 is passed through the sensor fastening hole 351*a*5 of the integral bracket 35, and the bolt 36*a* of the rear-side load detection sensor 36 is passed through the sensor fastening hole 351*c*5 of the integral bracket 35, and these bolts are fastened with the nuts 36*b*. In this state, when the lifter 30 is activated, the frame body 10 moves upward and downward relative to the slide rails 20. The lifter 30 is composed mainly of the front pipe 13, the rear pipe 14, the right front link 33, the left front link 37, the right rear link 34, the left rear link 38, the front bracket 31, the rear bracket 32, and the integral bracket 35.

Configured as has been described above, this embodiment achieves the following effects. The left front link 37 and the left rear link 38 are rotatably mounted at the lower end side with the rivets R, respectively on the side plate 352*a* of the front-side second part 352 and the front-side plate 353*a* of the rear-side second part 353 of the integral bracket 35. When seen from one side, the rivet R of the left front link 37 is located at a height position at which the rivet R partially overlaps the bottom wall 351*a*1 of the first part 351, and the rivet R of the left rear link 38 is located at a height position at which the rivet R partially overlaps the bottom wall 351*c*1 of the first part 351. This means that the side plate 352*a* is disposed on the lower side relative to the bottom wall 351*a*1 and accordingly the height position of the rivet R disposed on the side plate 352*a* can be lowered, compared with when the side plate 352*a* is disposed relative to the bottom wall 351*a*1 so as to form an L-shaped cross-section and the rivet R is provided on the side plate 352*a*. The same is true for the relation between the bottom wall 351*c*1 and the front-side plate 353*a*. Here, when seen from above, a part of the rivet R of the left front link 37 and a part of the rivet R of the left rear link 38 are prevented from overlapping the bottom wall 351*a*1 and the bottom wall 351*c*1 by the notch 351*a*7 and the notch 351*c*8. Accordingly, even when the height positions of the rivets R relative to the bottom wall 351*a*1 and the bottom wall 351*c*1 are lowered, interference between the rivets R and the bottom walls 351*a*1, 351*c*1 will not occur. Thus, even when the load detection sensors 36 are disposed between the upper rail 22 and the integral bracket 35 and the height positions of the bottom wall 351*a*1 and the bottom wall 351*c*1 are raised by the thickness of the load detection sensors 36, the height positions of the side plate 352*a* and the front-side plate 353*a* can be lowered by that thickness so as not to change the height positions of the rivets R. Thus, the automobile seat 1 can be provided which allows the same link members to be used for both specifications including mounting of the load detection sensor 36 and specifications not including mounting of the load detection sensor 36, and in which an increase in height of the seat surface is avoided without adding to the number of the components.

To couple the front-side second part 352 to the first part 351, the lower surfaces of the front plate 352b and the rear plate 352c of the front-side second part 352 are brought in contact with the upper surface of the bottom wall 351a1 of the first part 351 and these surfaces are coupled together by welding. To couple the rear-side second part 353 to the first part 351, the lower surface of the rear-side plate 353b of the rear-side second part 353 is brought in contact with the upper surface of the bottom wall 351c1 of the first part 351 and these surfaces are coupled together by welding. Thus, a load applied from the frame body 10 to the front-side second part 352 and the rear-side second part 353 is efficiently transferred to the first part 351. Moreover, the front plate 352b and the rear plate 352c of the front-side second part 352 and the rear-side plate 353b of the rear-side second part 353 extend while curving or bending in the left-right direction, which makes it possible to support the frame body 10 while preventing the side plate 352a and the front-side plate 353a from inclining in the left-right direction.

The bottom wall 351a1 and the bottom wall 351c1 of the first part 351 are provided respectively with the notch 351a7 and the notch 351c8 that prevent interference with the rivets R. Thus, interference between the bottom walls 351a1, 351c1 and the rivets R can prevented by such a simple structure.

While the specific embodiment has been described above, the present disclosure is not limited to the external appearance or the configuration of the embodiment, but various changes, additions, and omissions can be made without departing from the gist of the present disclosure. The following are examples of variations.

In the above embodiment, the integral bracket 35 is mounted through the load detection sensor 36 on the upper rail 22 of the slide rail 20 fixed to the floor F. However, the present disclosure is not limited to this example, and the integral bracket 35 may be mounted through the load detection sensor 36 on the floor F or on another bracket etc. mounted on the floor F.

In the above embodiment, two load detection sensors 36 are mounted only on the left-side slide rail 20. However, two load detection sensors 36 may be provided on each of the left- and right-side slide rails 20, or one load detection sensor 36 may be provided on each of the left- and right-side slide rails 20. Another brackets of which the front part and the rear part are not integral may be used.

Figure 13:
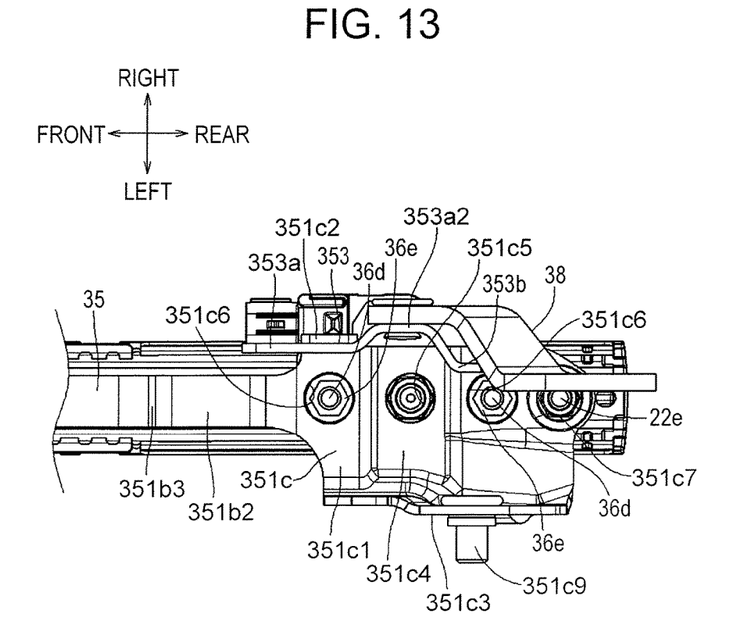
FIG. 13 is a view, corresponding to a part of FIG. 3, showing a modified example of the embodiment.

In the above embodiment, the notch 351a7 and the notch 351c8 are provided respectively in the bottom wall 351a1 and the bottom wall 351c1 corresponding to the positions at which the rivets R are provided. However, the present disclosure is not limited to this example, and instead of the notch 351c8 of the bottom wall 351c1, a bulge 353a2 bulging toward the right side may be provided in the rear-side second part 353 as shown in FIG. 13. The same is true for the notch 351a7 of the bottom wall 351a1 and the front-side second part 352. Here, the bulge 353a2 is an example of the "interference avoiding portion" in the claims.

In the above embodiment, the present disclosure is applied to the automobile seat 1. However, the present disclosure is not limited to this example, and may instead be applied to seats installed in vehicles such as airplanes, ships, and trains.

What is claimed is:

1. A vehicle seat comprising:
   a bracket; and
   a seat frame that is mounted on the bracket through coupling member, wherein:
   the bracket has main body extending in a horizontal direction, and upright wall extending upward from the main body and coupled to the main body;
   the coupling member is mounted at one end on the upright wall with fastening member extending in a direction in which the upright wall and the coupling member overlap each other;
   the upright wall is coupled to the main body so that the fastening member is located so as to at least partially overlap the main body in a height direction; and
   the main body is provided with interference avoiding portion that prevents interference with protruding portion of the fastening member protruding from the upright wall toward the main body.

2. The vehicle seat according to claim 1, wherein, to couple the upright wall to the main body, at least horizontal surfaces of the main body and horizontal surfaces of the upright wall is coupled together.

3. The vehicle seat according to claim 2, wherein the upright wall has bent portion that is bent in an extension direction of the fastening member and coupled to the horizontal surface of the main body.

4. The vehicle seat according to claim 1, wherein the interference avoiding portion is a notch provided in the main body.

5. The vehicle seat according to claim 1, wherein the interference avoiding portion is a bulge provided on the upright wall and bulging in a direction away from the main body.

6. The vehicle seat according to claim 1, wherein:
   the bracket is mounted on a vehicle floor through a slide rail;
   the slide rail includes an upper rail that is combined with a lower rail fixed to the vehicle floor so that the upper rail is slidable over the lower rail; and
   the main body of the bracket is mounted on the upper rail through a sensor.

7. The vehicle seat according to claim 6, wherein the sensor is a load detection sensor.

* * * * *